United States Patent [19]
Martinell

[11] Patent Number: 5,125,517
[45] Date of Patent: Jun. 30, 1992

[54] FOLD-DOWN BICYCLE RACK

[75] Inventor: Steven W. Martinell, Vancouver, Wash.

[73] Assignee: Racor, Inc., Vancouver, Va.

[21] Appl. No.: 686,507

[22] Filed: Apr. 17, 1991

Related U.S. Application Data

[63] Continuation-in-part of Ser. No. 567,664, Aug. 15, 1990.

[51] Int. Cl.$^5$ .............................................. A47F 7/00
[52] U.S. Cl. ........................................ 211/18; 211/17; 211/90
[58] Field of Search .................. 211/17, 18, 22, 21, 211/96, 99, 170, 150, 90, 104, 1.3; 224/42.03 B, 42.44

[56] References Cited

U.S. PATENT DOCUMENTS

| | | | |
|---|---|---|---|
| D. 313,957 | 1/1991 | Martinell | D12/115 |
| 1,039,694 | 10/1912 | Barton | 211/150 X |
| 1,713,295 | 5/1929 | Miller | 211/150 X |
| 1,826,055 | 10/1931 | Cornwall | 211/150 X |
| 2,068,028 | 1/1937 | Jernson | 211/104 |
| 2,317,437 | 4/1943 | Botta | 211/1.3 |
| 3,186,559 | 6/1965 | Glowa | 211/150 |
| 4,492,169 | 1/1985 | Ware et al. | 211/150 X |

FOREIGN PATENT DOCUMENTS 530342  7/1931  Fed. Rep. of Germany ........ 211/17

Primary Examiner—Blair M. Johnson
Attorney, Agent, or Firm—Chernoff, Vilhauer, McClung & Stenzel

[57] ABSTRACT

A wall-mountable storage rack for a bicycle or the like that can be collapsed into a folded-down compact state. The rack consists of three hingedly-connected portions, i.e., a shelf portion, a wall mount portion and a brace portion. Hinges respectively connect the wall mount portion to the shelf portion, and the brace portion to the shelf portion. The rack is adapted to support a bicycle horizontally by its top tube on a cradle formed as an extension of the shelf portion so that the bicycle wheels are held off the ground and free to rotate. With the bicycle so supported, minor maintenance may be performed on it with the rack thereby serving a secondary function as a maintenance stand.

5 Claims, 3 Drawing Sheets

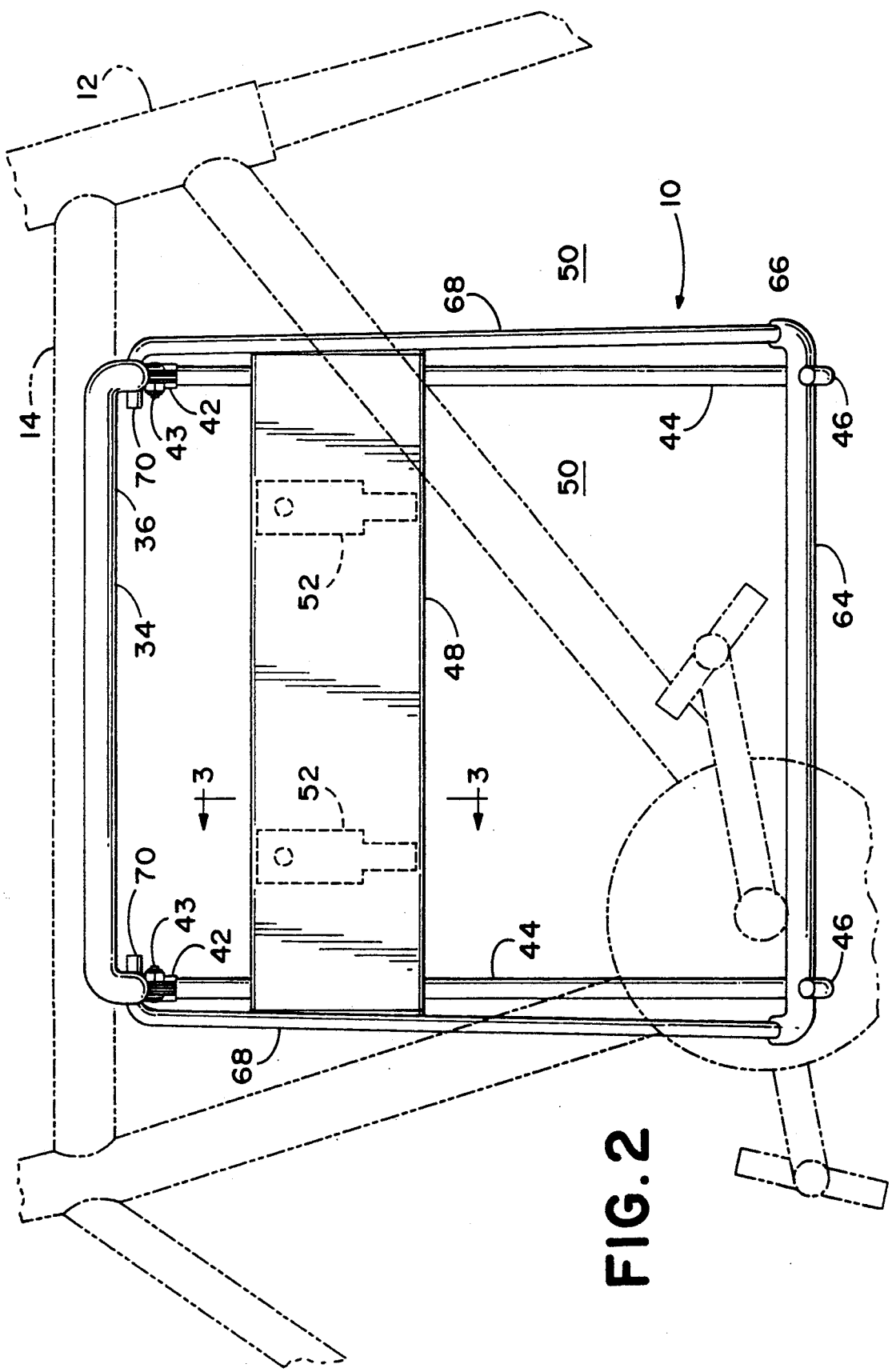

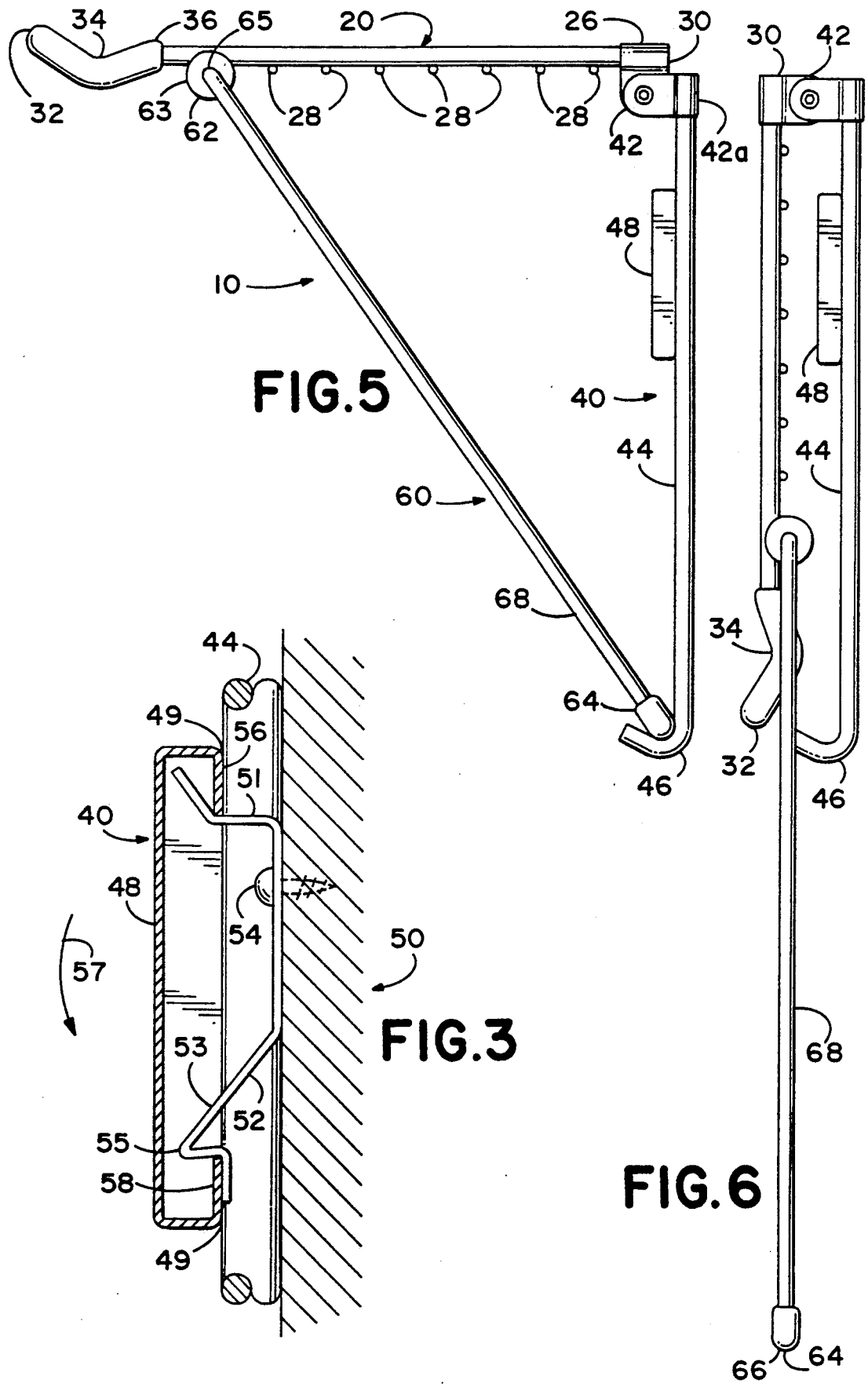

FOLD-DOWN BICYCLE RACK

CROSS-REFERENCE TO RELATED APPLICATIONS

This is a continuation-in-part of pending application Ser. No. 07/567,664 filed Aug. 15, 1990.

FIELD OF THE INVENTION

This invention relates to a wall-mountable article rack, particularly for holding a bicycle, that can be folded flat for compactness and convenience during storage and shipment, and also, after mounting to a wall, when not in use.

BACKGROUND OF THE INVENTION

There are currently in the prior art many designs of storage racks for storing sports equipment and particularly bicycles. One common configuration of bicycle storage rack is in the form of a floor-to-ceiling column with a support mechanism that grabs one of the tubes of a bicycle frame. A different style of bicycle rack mounts to a wall and either grips the bicycle frame with a jaw mechanism or supports the weight of the bicycle in a pair of horizontal arms. One of these latter types of bicycle racks is in the form of a rectangular board that mounts to a wall surface. The board has two outwardly extending arms which have half-circle cutouts near the distal ends, the diameter of the half circle being the approximate diameter of the tubing in a bicycle frame. The bicycle may be balanced in the half circle cutouts and thereby be supported by the protruding arms. This type of bicycle rack is efficient for storing bicycles and, in particular, appeals to bicycle riders who reside in apartments, small houses, or other spaces where storage space is a premium. The two-arm rack suspends the bike horizontally, thus permitting free rotation of the wheels, and, accordingly, the pedals can be rotated to actuate the drive mechanism for adjustment and simple maintenance thereof. However, because the extending arms are fixedly mounted to the planar board the storage rack is not readily collapsible causing two problems: namely (1) when the storage rack is not in use it cannot be configured so as to reduce the space it takes up, and (2) it takes up more space in a shipping or storage package, causing increased shipment and storage expense on its way to the retail consumer.

An alternative style of wall-mounted bicycle rack design is shown in the applicant's U.S. Pat. No. Des. 313,957 in which a bicycle is suspended by one of its wheels. The bike is stored in this type of rack by engaging the front or rear wheel with a hook and resting the bicycle wheels against the wall, essentially vertically hanging the bike from the hooked wheel. The disadvantages associated with this rack are: (1) when the bicycle is hanging from the rack, the bicycle extends substantially into the room in which it is stored because the wheels of the bicycle rest against the wall vertically and the bicycle extends outward from the wall at a right angle, (2) persons of diminutive stature frequently have difficulty raising the bicycle high enough to engage one of the wheels with the hook on the rack, and (3) when suspended on this type of rack most maintenance tasks cannot be readily carried out because the wheels are not free to rotate.

SUMMARY OF THE INVENTION

The bicycle rack of the present invention overcomes the deficiencies associated with prior art racks because it is a wall-mountable rack that supports a bicycle horizontally by its top tube, which rack can be readily collapsed into a compact configuration against the wall. Minor bicycle maintenance can readily be performed on a bicycle when held in the rack, and it is easy for a diminutive person to lift the bicycle up onto the rack. Because the bicycle rack of the present invention is easily collapsible it also facilitates easy shipment and storage.

The objects of the present invention are to provide:

A wall-mountable bicycle rack that folds flat for compactness and convenience during storage and shipment;

A wall-mounted bicycle rack that securely supports a bicycle, yet can be conveniently collapsed to lie compactly against the wall to which it is mounted;

A collapsible bicycle storage rack that holds the bicycle off the ground by its top tube horizontally to enable minor repairs and tuneups; and A method for performing maintenance and repairs on a bicycle by suspending it from a collapsible, wall-mounted rack.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 2 is a front elevational view of the bicycle rack of FIG. 1 showing a bicycle mounted thereon.

FIG. 3 is a partial, side sectional view taken along line 3—3 in FIG. 2.

FIG. 5 is a side elevational view of the bicycle rack of FIG. 1 as it would appear when in use.

FIG. 6 is a side elevational view of the bicycle rack of FIG. 1 as it would appear in its collapsed, compact state.

DETAILED DESCRIPTION OF THE INVENTION

Figure 1:
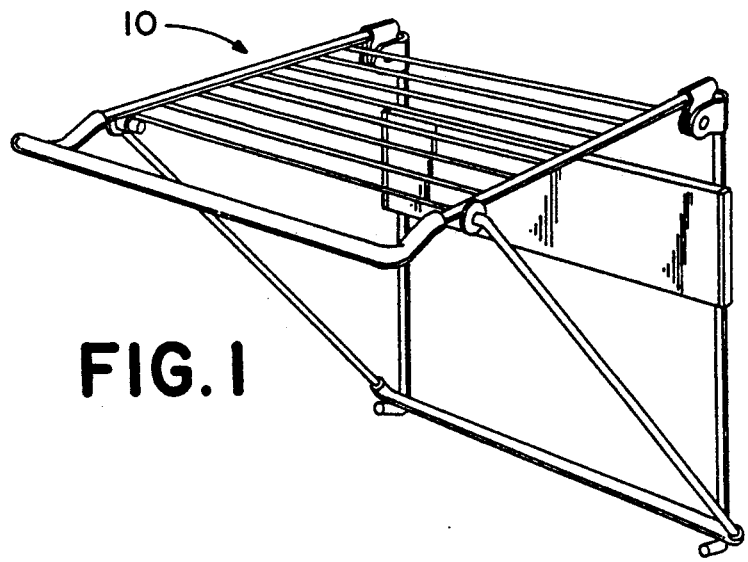
FIG. 1 is a perspective view of an exemplary bicycle rack of the present invention.

FIG. 1 shows a perspective view of an exemplary embodiment of a wall-mounted storage rack, according to the present invention, for supporting a bicycle or other equipment or articles.

As is best illustrated in FIG. 5, the rack consists of three hingedly-connected portions: i.e., the shelf portion 20, the wall mount portion 40 and the brace portion 60. The wall mount portion is connected to the shelf portion by the proximal hinges 42, and the brace portion 60 is connected to the shelf portion by the distal hinges 62. (The brace portion is not hingedly connected directly to the wall mount portion 40, but, as explained below, is selectively engageable thereto.)

Figure 4:
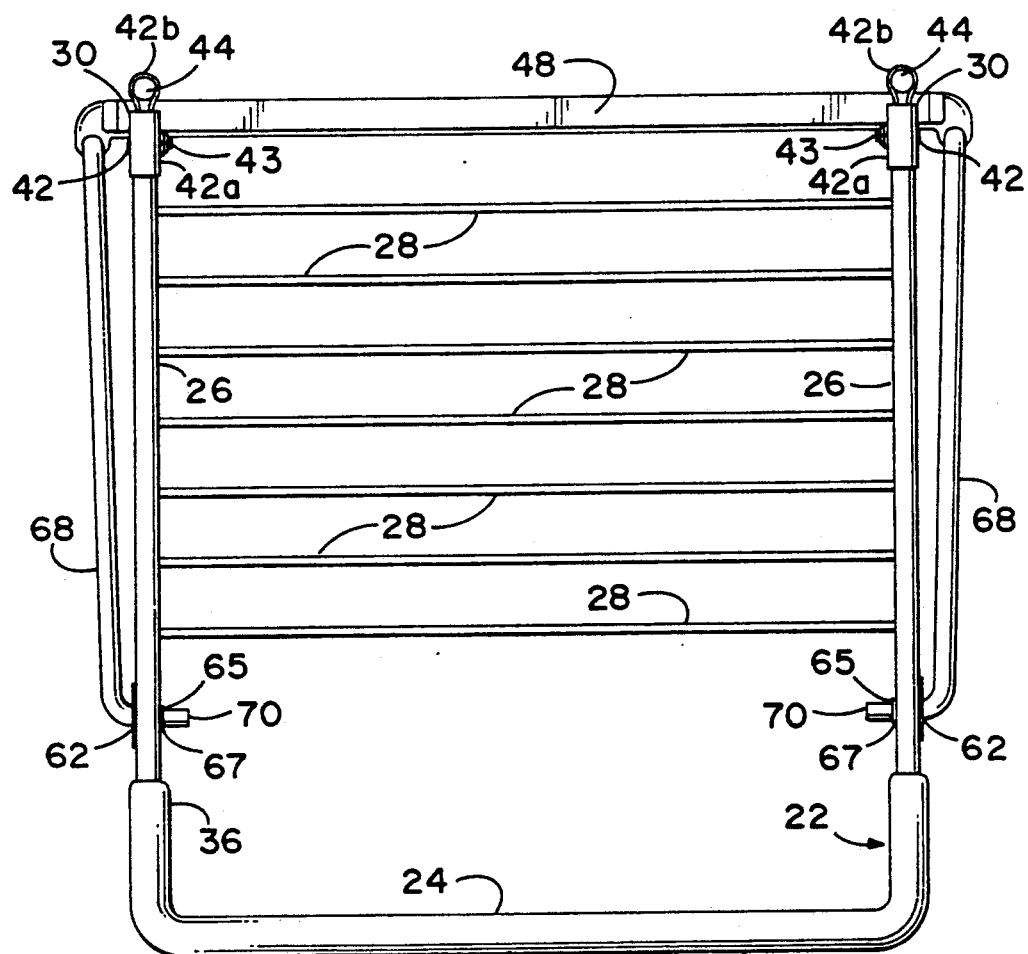
FIG. 4 is a top, plan view of the bicycle rack of FIG. 1.

The shelf portion 20 is planar in form (see FIG. 4), with a proximal end 30 and a distal end 32, and comprised of a U-shaped bar 22, having a base 24 and two arm portions 26, and a plurality of parallel-extending spaced wire rods 28 that span between the two arm portions and are fixedly connected thereto. Referring now to FIGS. 2 and 5, the shelf's distal end 32 has a cradle 34 formed by bends in the arms 26 thereby adapted to support the top tube 14 of the frame of a bicycle. The cradle 34 of the U-shaped bar 22 is preferably covered with a resilient non-slip material 36 so that the bicycle frame may rest therein without sliding and marring the paint finish on the bicycle's tube. As an alternative embodiment the rack may include an extension of the shelf's distal end outwardly from the proximal end so as to form a plurality of spaced, parallelly-arranged cradles for holding two or more bicycles.

The wall mount portion 40 is adapted to be securely mounted to a wall or other vertical surface. Referring to FIGS. 2, 3 and 5, there is shown a pair of vertically-positioned parallel post members 44. Exemplarily, the posts 44 are round metal bars with lower ends formed into a hook-like configuration creating upturned fingers 46, and the post's upper ends are connected to the proximal hinges 42. The two posts 44 are fixedly connected to an escutcheon 48 and spaced apart the same distance as the arms 26 on the shelf portion 20. (A cross-section of the escutcheon 48 is shown enlarged in FIG. 3 where it can be seen as fixedly connected to the post member 44 along its lines of contact at 49.)

The brace portion 60 is in the form of a U-shaped round metal bar having a bight portion 64 and support legs 68. The bight portion 64, which is preferably encased in a resilient, non-slip material 66, is engagingly compatible with the upturned fingers 46 at the lower end of the posts 44 to provide the structural support necessary to support the distal end 32 of the weight-bearing shelf portion 20. The support legs 68 of the brace terminate in inwardly-turned fingers 70 that connect to the distal hinges 62. Thus, the force of a load on the cradle is transferred through the brace legs to the posts.

The hinges 42 and 62 permit the three portions of the rack to freely rotate with respect to one another about one axis only, that axis being parallel to base 24 of the shelf portion 20 and perpendicular to the plane of view of FIG. 5. Exemplarily, each of the hinges 42 is a simple hinge consisting of two strips of thin metal 42a and 42b overlapping at their ends and circumscribing post 44 of the wall portion and an associated arm 26 of the shelf portion, respectively. A hole is formed through each of these metal strips near its end and a hinge bolt 43 is inserted therein. The hinge bolt is tightened to the extent that there is no looseness between the strips 42a and 42b, but not so tight as to prevent rotation of one metal strip with respect to the other.

The brace portion 60 is connected to the shelf portion by the distal hinges 62. Fixedly mounted to the distal end of the arms 26, there is a respective disk portion 63 with center hole 65 further defined by stand-off shaft tube 67. The hole 65 is large enough to engagingly accept the inwardly-turned fingers 70 such that the brace portion 60 is hingedly connected to the shelf portion 20.

FIG. 3 shows an exemplary method of mounting the rack's wall mount portion 40 to a vertical wall surface 50. First, a pair of brackets 52 are attached, in spaced relationship, to the wall 50 by a fastener means 54 such as a wood screw or lag bolt. (The fastener means 54 should be connected to a surface offering sufficient strength to support the weight of the rack and a bicycle, plus a factor of safety.) After the brackets 52 are attached to the wall, the upper lip 56 of the escutcheon 48 is slid over the top of the bracket 52 and then slid downward until lip 56 comes in contact with an upper surface 51 of the bracket. The escutcheon is next rotated and pressed firmly downward in the direction of arrow 57 so that an escutcheon bottom lip 58 engages a bottom deformable portion 53, and then forces past a nose portion 55 until the nose is free to snap back into place capturing the bottom lip. In this fashion the posts 44 are pressed firmly against the wall 50 and the wall-mounted portion securely affixed to the wall, thereby supporting the bicycle rack 10.

To make the rack operational so as to support a bicycle thereon, the wall mount portion 40 is securely affixed to a wall as described above and thereafter the shelf portion 20 is rotated about the proximal hinges 42 to a position wherein the distal end 32 of the shelf is slightly higher than the proximal end 30, thus permitting the brace portion 60 to be rotated about distal hinges 62 inwardly towards the wall, after which the shelf portion 20 is lowered to engage the bight portion 64 with the upturned fingers 46 of the posts 44. In this operational configuration, weight may be placed upon the shelf portion 20 and be supported by the brace member 60 and the hinges 42, both of which in turn are connected to the wall mounted posts 44.

When the rack is not in use supporting a bicycle, it may be conveniently folded down against the wall so as to take up less space outwardly. The bicycle rack is made compact by raising the shelf's distal end 32 to allow the bight portion 64 to disengage from the upturned fingers 46 and swing free, pivoting about the hinges 62. Thereafter, the distal end 32 of the shelf portion may be lowered until it is substantially parallel to the plane of the wall to which the rack is mounted—this folded-down, compact, configuration is shown in FIG. 6.

When the rack is restored to its operational configuration (FIG. 5) and a bicycle is mounted thereon as is shown in FIG. 2, the rack can serve to facilitate mechanical maintenance on the bicycle. When so used, the wheels of the bicycle are held off the ground by the rack and its pedals are free to rotate, thereby engaging the drive mechanism of the bicycle and enabling the user to perform mechanical adjustments and maintenance on the bicycle. Furthermore, because the bicycle is supported by its top tube 14 and its wheels are off the ground, the front and rear wheels of the bicycle may be easily removed from the bicycle frame for servicing. The shelf portion 20 also serves as a convenient platform for temporarily storing tools that may be used in maintaining and tuning the bicycle.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. Wall-mountable storage means for supporting a bicycle of the type having a horizontal top tube member as a part of the frame thereof, comprising:
   (a) a pair of arms spaced apart and interconnected by at least two elongate rods such that a shelf-like surface is formed, said arms each having a proximal end and a distal end;

(b) cradle means fixedly connected to said distal ends of said respective arms for cradling horizontally said top tube of said bicycle;

(c) at least two interconnected vertically arranged posts each having an upper end hingedly connected to a respective proximal end of said arms and a lower end with finger means; and (d) a brace member having two leg portions held substantially parallel and separated by a bight portion, wherein said bight portion is engageable with said fingers of said vertical posts, said legs are hingedly connected to respective distal ends of said arms for supporting said shelf-like surface substantially horizontally, and said bight portion is disengageable from said posts so as to permit said arms to rotate into a vertical position.

2. The equipment storage means of claim 1 wherein said cradle means is encased in a resilient, non-slip material.

3. The equipment storage means of claim 1 wherein said cradle means is integral to said arms.

4. The storage means of claim 1 wherein said leg portions form the hypotenuse of a substantially right triangle whose perpendicular sides are the respective arms and posts such that said posts may be attached to a vertical wall surface thereby maintaining the arms and shelf-like surface in a horizontal position.

5. The storage means of claim 1 wherein said cradle means comprises means for horizontally cradling a plurality of top tubes of bicycles.

* * * * *